United States Patent
Samela et al.

[11] Patent Number: 5,815,208
[45] Date of Patent: Sep. 29, 1998

[54] VGA TO NTSC CONVERTER AND A METHOD FOR CONVERTING VGA IMAGE TO NTSC IMAGES

[75] Inventors: Francis M. Samela, Lombard; Joseph R. Llorens, Winfield, both of Ill.

[73] Assignee: Methode Electronics, Inc., Chicago, Ill.

[21] Appl. No.: 353,094

[22] Filed: Dec. 9, 1994

[51] Int. Cl.$^6$ .................................. H04N 7/01
[52] U.S. Cl. ..................... 348/446; 348/910; 345/154
[58] Field of Search ...................... 348/446, 443, 348/453, 552, 447, 448; 345/154, 132

[56] References Cited

U.S. PATENT DOCUMENTS

| | | | |
|---|---|---|---|
| 4,272,787 | 6/1981 | Michael et al. | 348/910 |
| 4,322,750 | 3/1982 | Lord et al. | 348/910 |
| 4,455,572 | 6/1984 | Malden | 348/910 |
| 4,506,298 | 3/1985 | Mansell et al. | 348/910 |
| 4,580,134 | 4/1986 | Campbell et al. | 348/420 |
| 4,827,341 | 5/1989 | Akimoto et al. | 348/530 |
| 5,117,289 | 5/1992 | Farley et al. | 358/140 |
| 5,264,835 | 11/1993 | Shaw et al. | 345/150 |
| 5,270,687 | 12/1993 | Killebrew, Jr. | 345/150 |
| 5,325,179 | 6/1994 | Azar et al. | 348/443 |
| 5,327,156 | 7/1994 | Masukane et al. | 345/113 |
| 5,329,290 | 7/1994 | Schwarz et al. | 345/132 |
| 5,363,202 | 11/1994 | Udagawa et al. | 358/501 |
| 5,455,628 | 10/1995 | Bishop | 348/446 |

OTHER PUBLICATIONS

Xilinx, Inc., The Programmable Logic Data Book, 1994, pp. 2–1 through 2–4 and 2–177 through 2–184.
Brooktree Corp., Brooktree Graphics and Imaging Product Databook, 1993, pp. 3–129 thorugh 3–172.

*Primary Examiner*—Victor R. Kostak
*Attorney, Agent, or Firm*—Jeffrey H. Canfield; David L. Newman

[57] ABSTRACT

A system and a method are provided for conversion of a display of a computer monitor from VGA signals to NTSC signals for display on a television screen. The system implements a circuit which reduces flicker in the output of the NTSC screen. The system includes an input device for inputting a signal in an identifiable mode to stored non-interlaced data relating to the VGA image signals in field memory areas. The VGA image signals are converted in the field memory areas stored to interlaced NTSC image signals. A controller controls the storage and conversion of the VGA signals to NTSC image signals in field memory areas to produce an output.

23 Claims, 14 Drawing Sheets

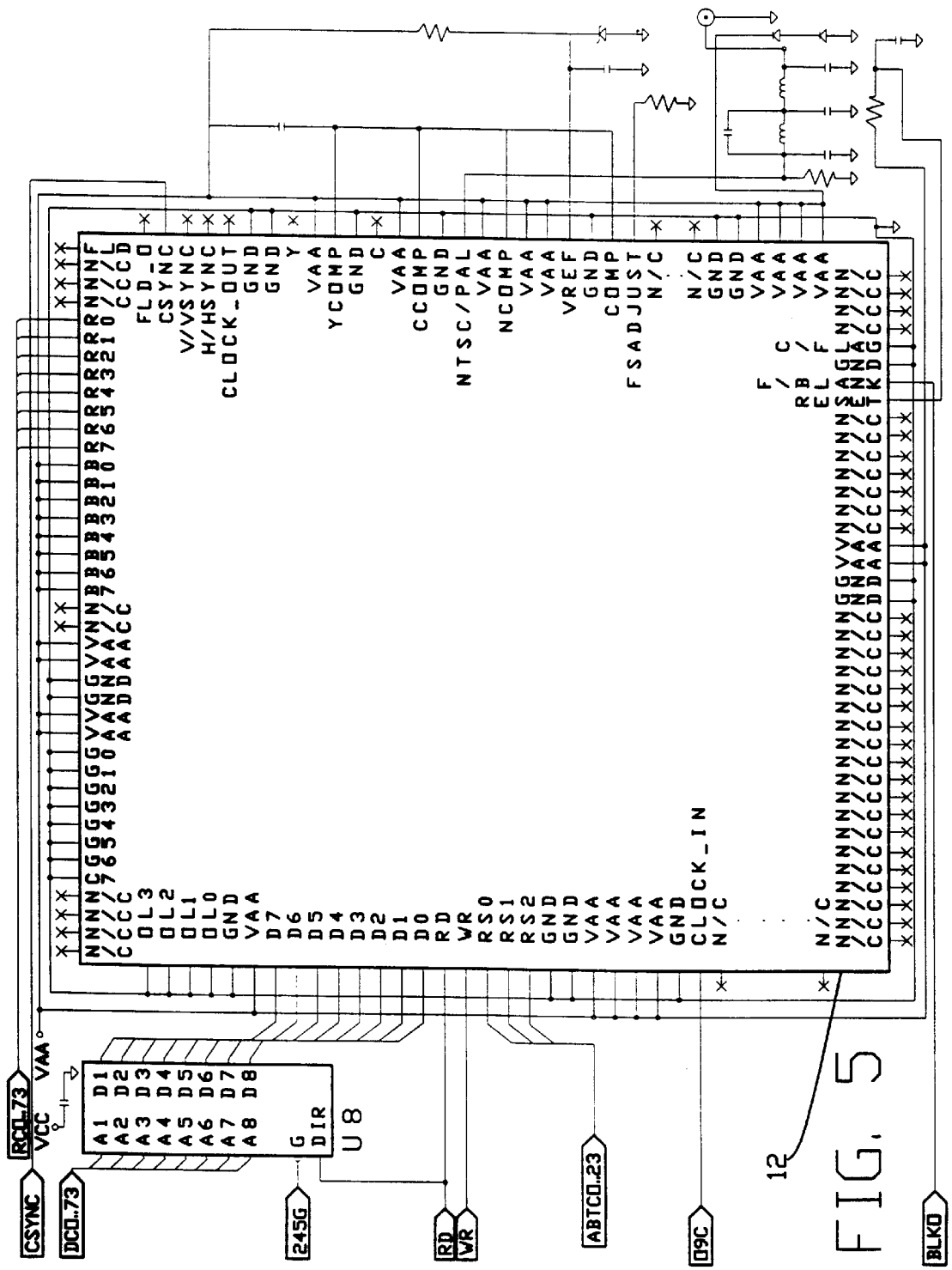

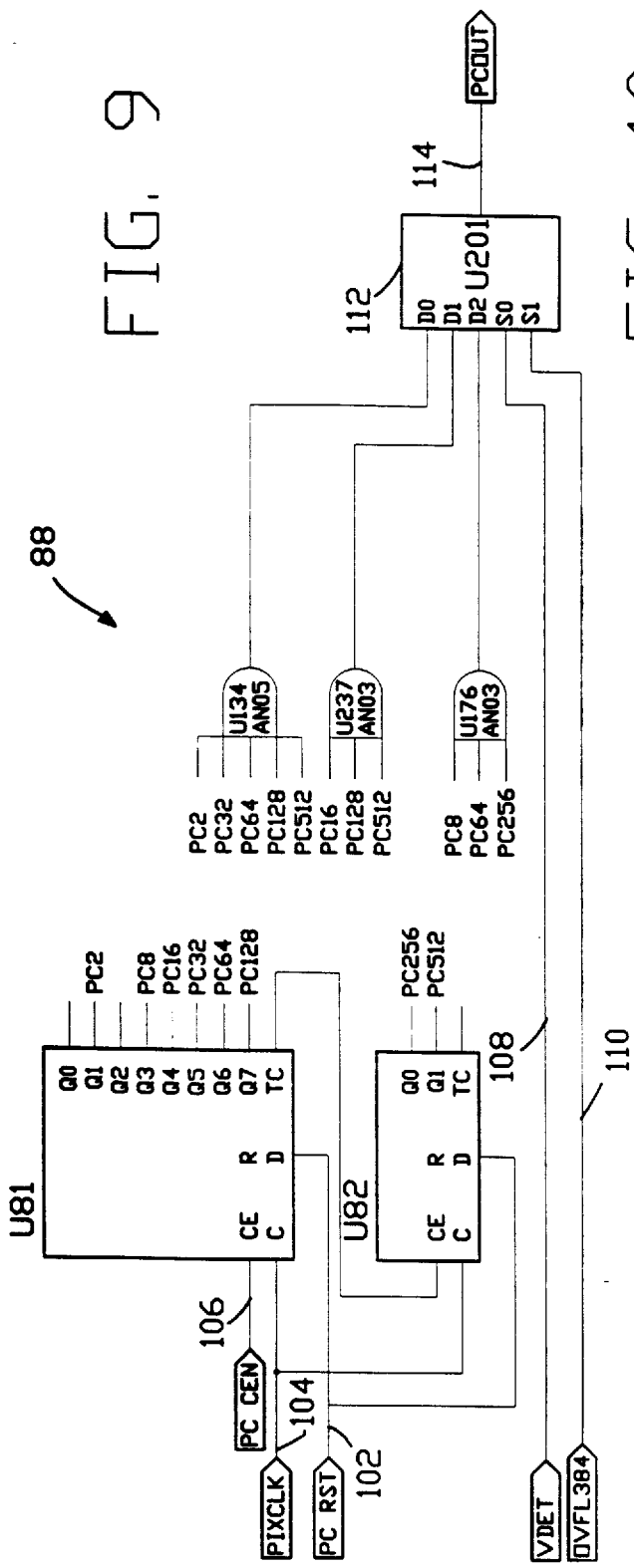
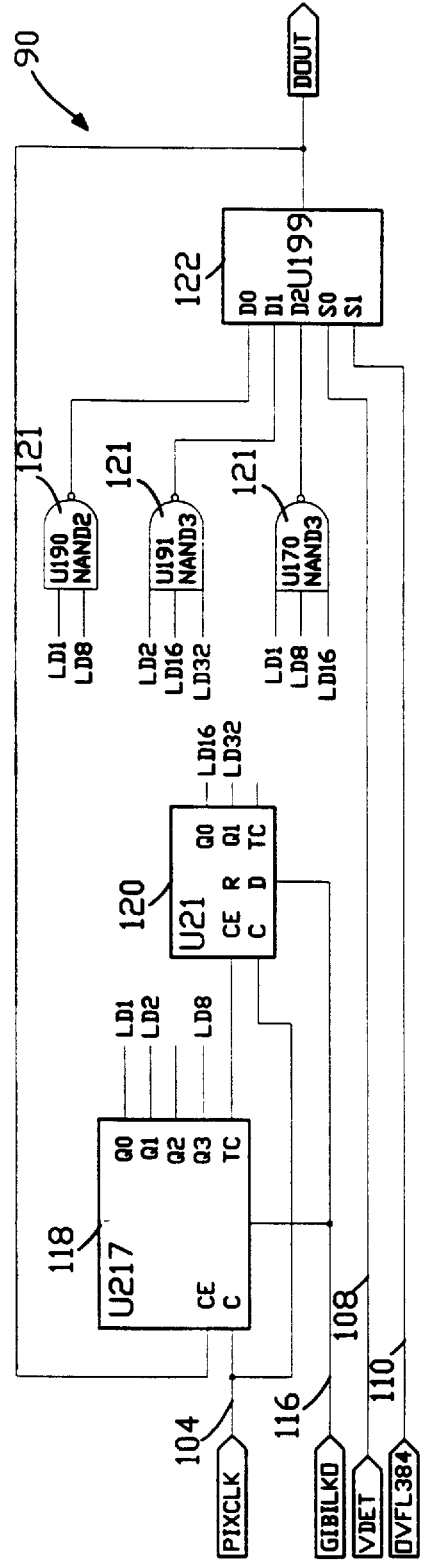
FIG. 9
FIG. 10

VGA TO NTSC CONVERTER AND A METHOD FOR CONVERTING VGA IMAGE TO NTSC IMAGES

BACKGROUND OF THE INVENTION

The present invention generally relates to a system and a method for conversion of a display of a computer monitor from video graphics adapter (VGA) signals to National Television Standards Committee (NTSC) signals for display on a television screen. More specifically, the present invention relates to conversion of non-interlaced VGA format computer images, which are in accordance to those of the Video Electronics Standards Association (VESA), to standard television or interlaced NTSC format images of high quality without flicker being present in the display of the converted image.

Computers use a VGA monitor as an output device to allow a user to view the function being performed by the computer. The VGA monitor resembles a television screen but many differences exist between the VGA monitor and the television screen. Because of differences between the two output devices, a computer user cannot use a standard television as an output device of the computer. In order to use a television screen as an output device for a computer, VGA signals must be converted to NTSC signals.

It is, of course, generally known how to convert VGA format computer images to NTSC format television images. However, known devices require complex reconstruction of the images into a memory prior to converting to NTSC images. Therefore, known systems and methods for doing the same are both expensive and require a great deal of space and complex circuitry for effecting the same. One of the main differences between VGA signals and NTSC signals is the manner in which the signals are scanned across the screen. Both VGA and NTSC scan a frame of lines of video signals from the top to the bottom of the screen. In the non-interlaced VGA system, all of the lines for one frame are scanned in sequence from top to bottom. In the interlaced NTSC system, the frame is scanned as two fields, each field containing half of the lines of a frame. The first field contains all of the odd-numbered lines and the second field contains all of the even-numbered lines.

Another problem associated with known methods of conversion of VGA signals to NTSC signals is flicker in the display of the converted image. Flicker is caused on an NTSC monitor screen when a pixel or horizontal group of pixels of a higher intensity are bordered on both the top and bottom by lower intensity pixels. Since an NTSC signal is scanned on every other line, the amount of time it takes to re-scan the line containing the high intensity pixels is long enough to allow the phosphor to begin to fade. This fading becomes more noticeable the greater the difference is between the high intensity pixels and their bordering low intensity pixels.

Furthermore, conversion of VGA formatted signals into NTSC signals can only be accomplished if the VGA mode is known. The three VESA VGA modes are 640×480, 320×200 and text mode. In the past, recognition of a VESA VGA mode required expensive and complex circuitry.

A need, therefore, exists for an improved system and a method for converting VGA signals to NTSC signals such that a television screen may be used as a monitor for a computer. In addition, an improved system and a method are required which reduce flicker in the output NTSC screen. Furthermore, an improved system and a method are required for specifically identifying the VESA mode of a VGA signal.

SUMMARY OF THE INVENTION

The present invention provides a system and a method for converting VGA signals to NTSC signals such that a television screen may be used as a computer monitor. In addition, the present invention relates to a system and a method having reduced flicker in the output NTSC screen. Furthermore, an improved system and a method are provided for specifically identifying the VESA mode of a VGA signal.

To this end, in an embodiment, a system is provided for converting non-interlaced VGA image data to interlaced NTSC encoded image signals. The system has a means for storing non-interlaced VGA image data as data within field memory areas. In addition, there are means for controlling, operatively connected to the means for storing, such that interlaced NTSC encoded image signals are produced from the data within the field memory areas.

In an embodiment, the system further comprises means for filtering the data in the field memory areas to reduce flicker within the NTSC encoded image signals. The means for filtering alternately read odd-numbered and even-numbered interlaced field memory areas.

In an embodiment, the system further comprises means for detecting the identifiable mode of the VGA image data. The means for detecting includes a counter to count pixels and an integrator.

In an embodiment, the identifiable modes of the system are at least one of a 640×480 graphics mode, a 320×200 graphics mode, and a text mode.

In an embodiment, the system further comprises a memory storing instructions to output to the means for controlling wherein the instructions program the means for controlling to produce the output.

In an embodiment, the means for storing includes a plurality of field buffer memory locations. Each of the plurality of field buffer memory locations includes information relating to a corresponding NTSC field. In an embodiment, the means for controlling is a field programmable gate array.

In an embodiment, the means for controlling includes a plurality of circuits operatively connected from a group of circuits including an address decoder, a field write controller, a pixel clock generator, a pixel counter, a left delay counter, a last line counter and a top delay counter.

In another embodiment of the present invention, a method is provided for converting VGA image signals to NTSC image signals. The method comprises the steps of: storing non-interlaced VGA image data as data within field memory areas; reading the data in the field memory areas to produce interlaced NTSC encoded image signals; and controlling the storing and reading steps through circuitry configured by programmed instructions.

In an embodiment, the method further comprises the step of filtering the data within the field memory areas to reduce flicker within the interlaced NTSC encoded image signals.

In an embodiment, the method further comprises the step of detecting the identifiable mode of the VGA image signals. Further, the method comprises the steps of integrating a VSYNC signal and counting a number of pixel clock signals per line to detect the identifiable mode.

In another embodiment of the present invention, a circuit is provided for controlling the reading of a frame buffer. The circuit comprises an input means capable of controlling a switch by producing a signal where a multiplexer receives the signal from the input means and produces a driving signal corresponding to either a filtered or unfiltered frame buffer read output enable command. A first inverter receives the driving signal and produces an output. A pair of OR gates each having a pair of inputs is provided wherein one input of the first OR-gate receives the output of the first inverter and one input of the second OR-gate receives the multiplexer driving signal. A second inverter receives a blanking signal and produces an output wherein the output is forwarded to a second input of each of the OR-gates wherein each of the ORO gates produces an output enable signal based on its inputs.

In an embodiment, the filter frame buffer output enable command circuitry comprises: a first flip-flop having an alternating output clocked by the blanking signal; a first XOR gate having two inputs with one input connected to the alternating output of the first flip-flop and the second input connected to the output of a second flip-flop, the Q output of the first XOR gate connected to the multiplexer; a second XOR gate having two inputs with one input connected to the alternating output of the first flip-flop and the second input connected to the output of the first inverter, the output of the second XOR gate connected to the D input of the second flip-flop; and the second flip-flop being clocked by a pixel clock and reset by a read enable signal for reading the frame buffer.

It is, therefore, an advantage of the present invention to provide a system and a method for converting VGA format computer images to standard NTSC format images.

And, another advantage of the present invention is to provide a system and a method for producing NTSC images without flicker.

Yet another advantage of the present invention is to provide a system and a method for converting VGA images to NTSC images that is both simple and requires little space.

Moreover, an advantage of the present invention is to provide a system and a method for converting VGA images to NTSC images that is inexpensive.

A still further advantage of the present invention is to provide a system and a method for converting VGA images to NTSC images wherein the mode is identifiable prior to conversion.

These and other advantages of the present invention will be described in and will be apparent from the detailed description of the presently preferred embodiments and from the drawings.

BRIEF DESCRIPTION OF THE DRAWINGS

FIG. 5 illustrates a schematic diagram of a further portion of an embodiment of the VGA to NTSC converter of the present invention comprising a RGB to NTSC encoder and other support circuitry.

FIG. 9 illustrates a circuit diagram of a pixel counter depicted in FIG. 8(b) and used in the present invention for generating a signal to indicate when 738, 656, or 328 pixels have been counted depending on the VESA graphics mode indicated by the circuity of FIG. 7(b).

FIG. 10 illustrates a circuit diagram of a left delay counter depicted in FIG. 8(b) and used in the present invention for generating a left delay signal which is dependent on the VESA graphic mode indicated by the circuitry of FIG. 7(b).

DETAILED DESCRIPTION OF THE PRESENTLY PREFERRED EMBODIMENTS

The present invention provides a system and a method for conversion of VGA signals to NTSC signals such that a television screen may be implemented as a computer monitor. Furthermore, the present invention relates to a system and a method that substantially eliminates flicker in the NTSC signal and subsequent display of the image produced from the NTSC signal. In addition, the present invention relates to a system and a method for specifically identifying a given VESA mode.

Figure 1:
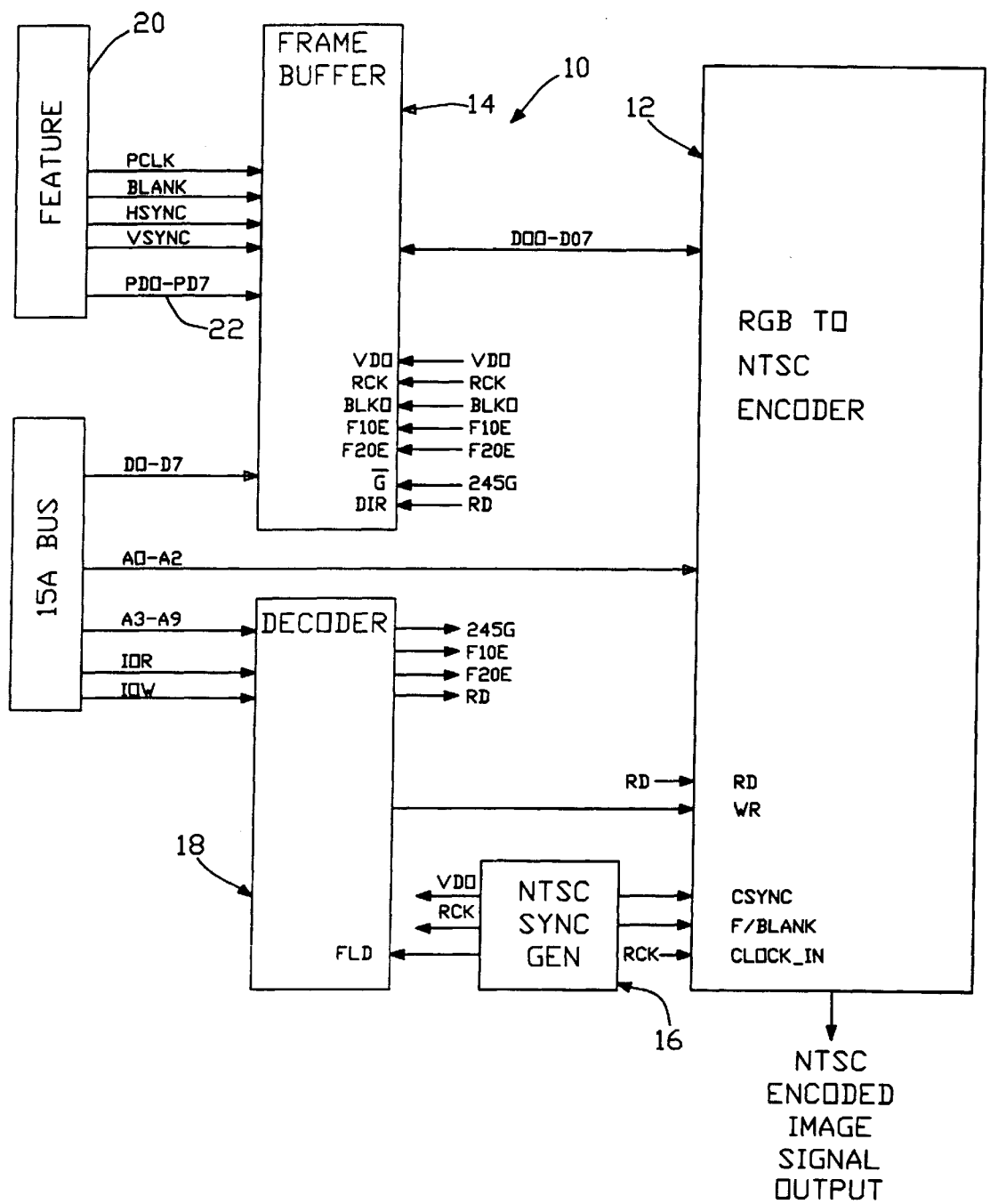
FIG. 1 illustrates a block diagram of an embodiment of a VGA to NTSC converter of the present invention.
Figure 2:
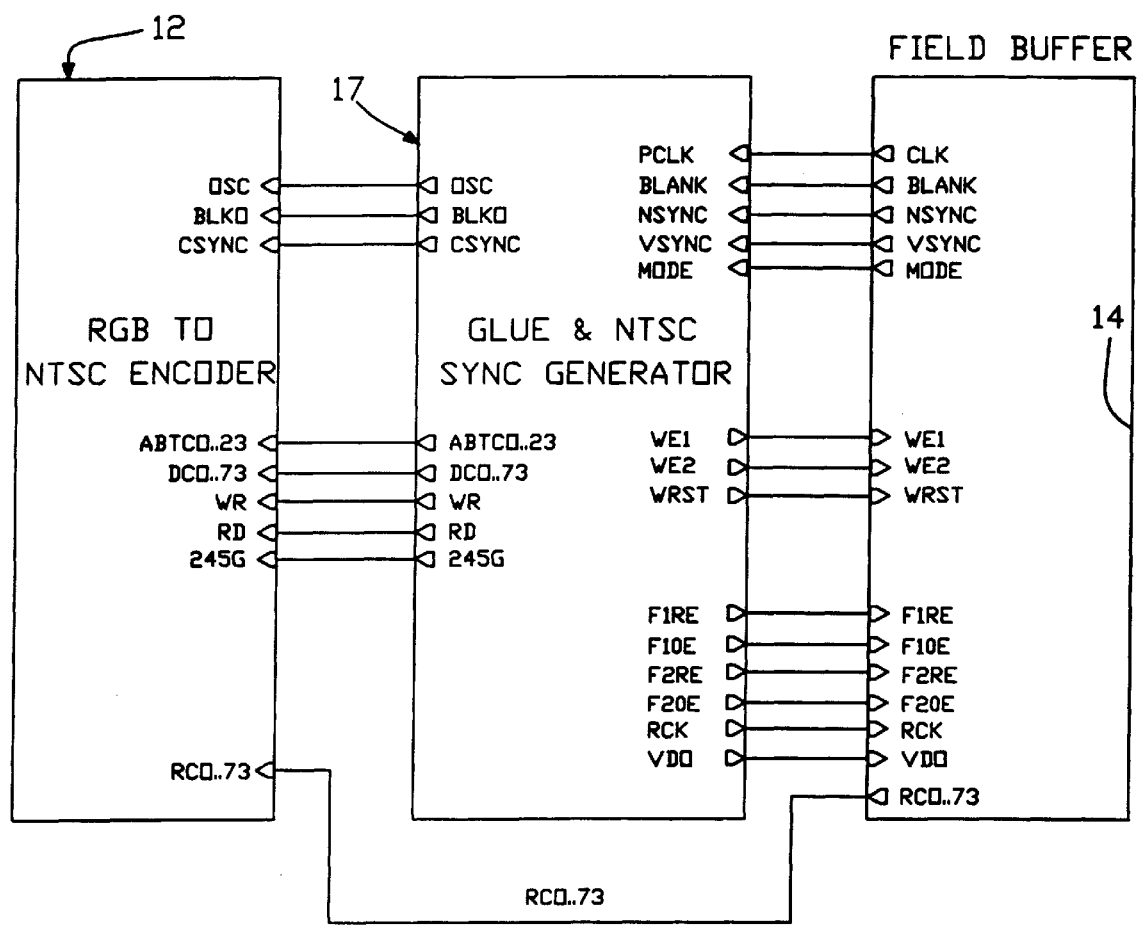
FIG. 2 illustrates a block diagram of the primary components necessary for converting signals from VGA format to NTSC format in an embodiment of the present invention.

Referring now to the drawings, FIG. 1 generally illustrates a block diagram for conversion of VGA signals to NTSC signals in the form of a converter 10. There are four primary components of the converter 10, namely an RGB to NTSC encoder 12, a frame buffer 14, an NTSC synchronization generator 16 and "glue logic" in the form of a field programmable gate array (not shown) used to emulate the decoder 15 and the circuitry needed to connect and to control the RGB to NTSC encoder 12, the frame buffer 14 and the NTSC synchronization generator 16.

A VGA card in a computer generates VGA output signals to a VGA monitor. The VGA card has a connector for transmitting various VGA output signals which is referred to as a feature connector as illustrated in FIG. 1 at numeral 20. The VGA output signals transmitted via the feature connector 20 consists of a pixel clock signal (PCLK), a vertical and horizontal blanking signal (BLANK), a horizontal sync signal (HSYNC), a vertical sync signal (VSYNC) and eight data lines 22 (PDO–PD7) generally referred to as pixel data. The pixel data consists of addresses for a palette that contains up to two-hundred fifty-six RGB values. Correspondingly, the RGB to NTSC encoder 12 has its own RGB palette which is loaded with the same values as the palette of the computer through the ISA bus of the computer. The RGB to NTSC encoder 12 also has a digital-to-analog converter that converts the stored values in the pallet into NTSC analog signals when the pixel data is presented to the encoder 12 from the frame buffer 14. Within this embodiment, the RGB to NTSC encoder 12 used in the converter 10 may be a Brooktree® BT 855 (Brooktree Corporation, San Diego, Calif.).

As previously discussed, one of the main differences between VGA signals and NTSC signals is the way the signals are scanned across the screen. As mentioned, in the interlaced NTSC system, the frame is scanned as two fields wherein each field contains half of the lines of a frame. The first field contains all of the odd-numbered lines, and the second field contains all of the even-numbered lines.

Figure 3:
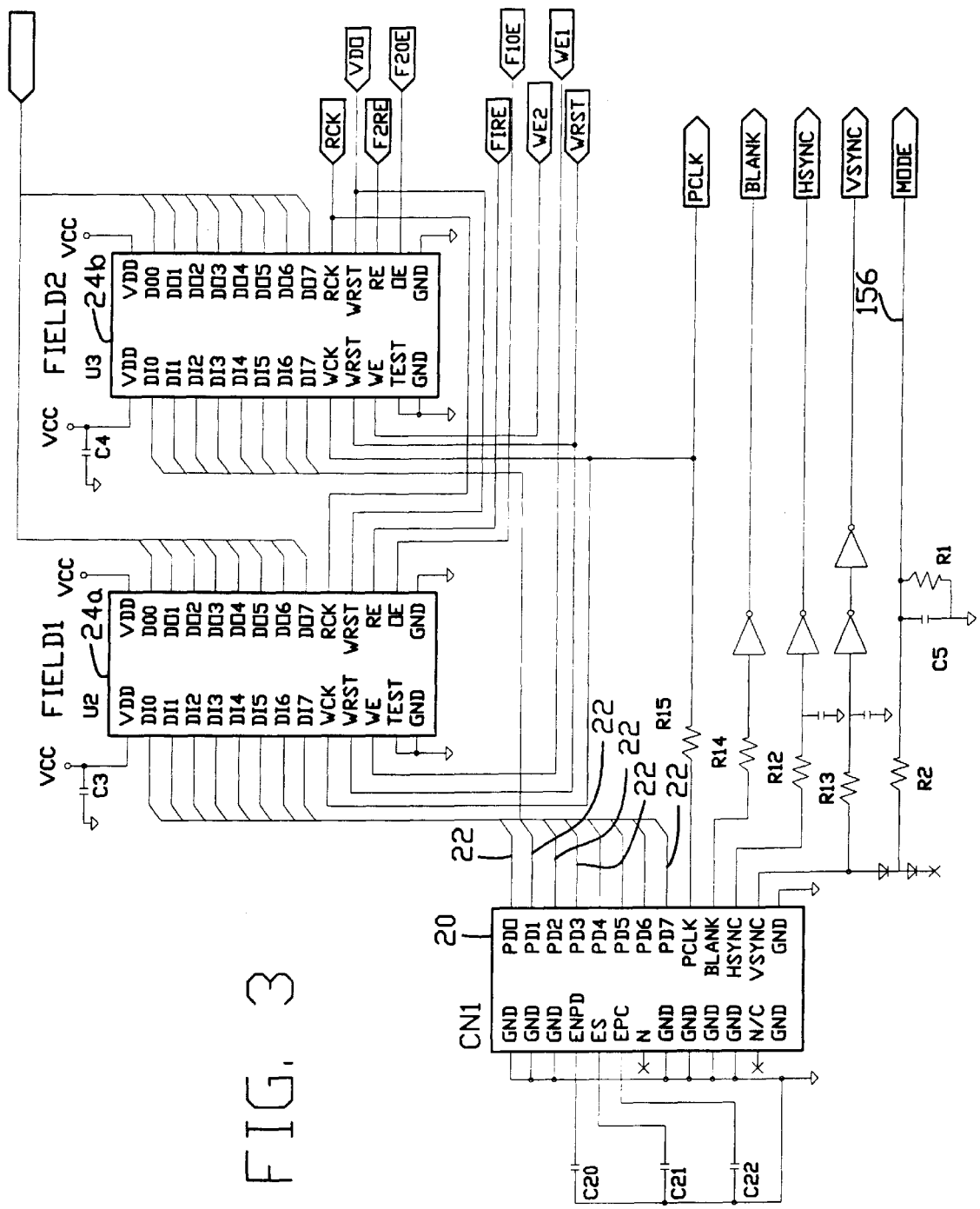
FIG. 3 illustrates a schematic diagram of the field buffers and feature connector for an embodiment of the VGA to NTSC converter of the present invention.

In order to compensate for the difference in scanning fields between non-interlaced VGA and interlaced NTSC fields, the converter 10 of the present invention contains the frame buffer 14. Referring to FIG. 3, the frame buffer 14 includes two field buffer memory chips 24a, 24b. The field buffer memory chips 24a, 24b provide memory locations for alternately storing pixel data from the feature connector as the lines are scanned. Therefore, each field buffer memory chip 24a, 24b contains the information for one NTSC field which is to be sent to the RGB to NTSC encoder 12 in FIG. 5.

Turning back to FIG. 1, the NTSC sync generator 16 synchronizes the reading of the video information stored in the frame buffer 14 of the converter 10. This is required since one of the main differences between VGA signals and NTSC signals is the timing of the synchronization signals that control the scanning of the video information. Therefore, the NTSC sync generator 16 provides signals used in the reading of the video information stored in the frame buffer 14 of the converter 10 and, correspondingly, the VGA sync signals from the feature connector 20 are used to control the writing of the VGA video information into the frame buffer 14.

Figure 4:
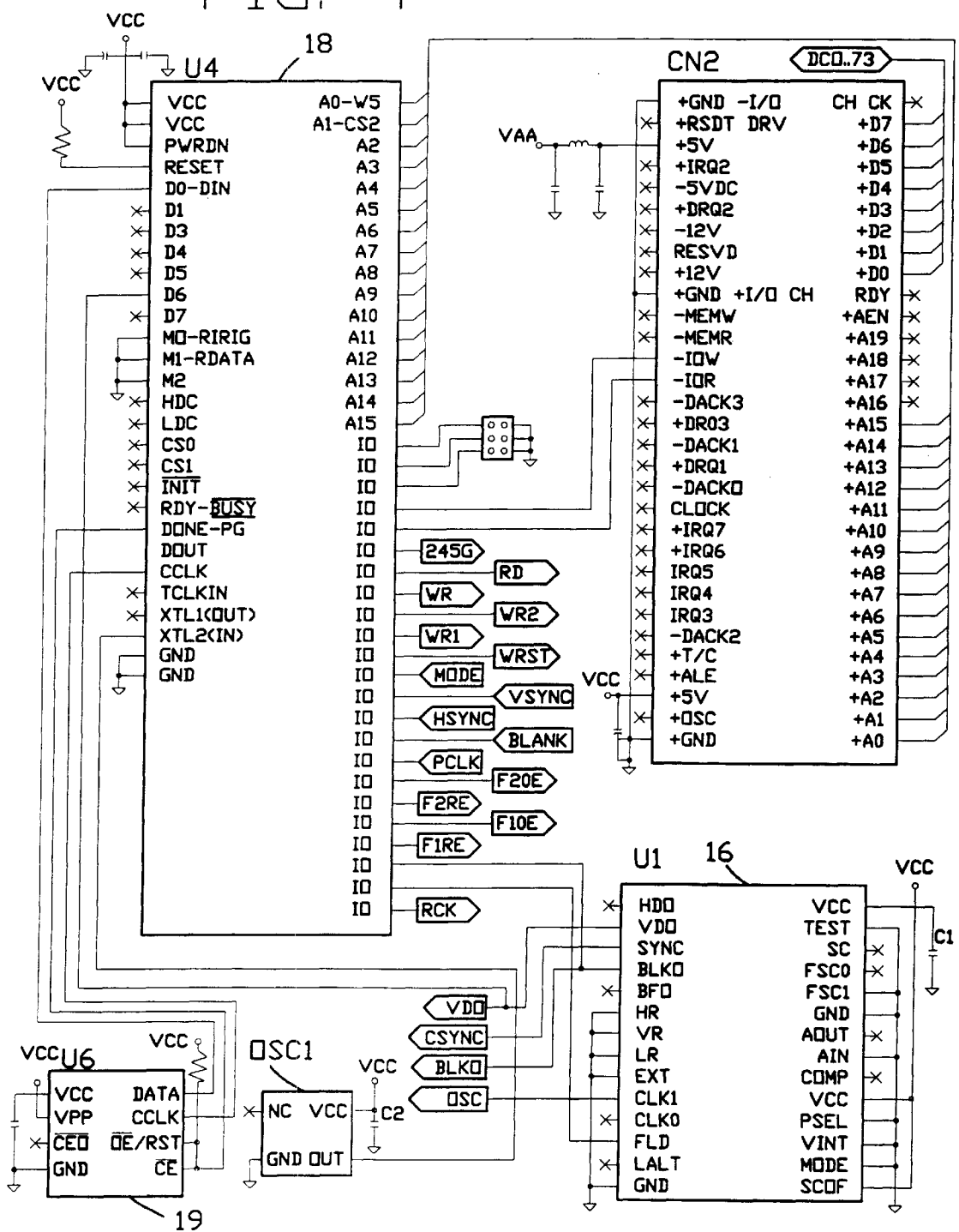
FIG. 4 illustrates a schematic diagram of an embodiment of a portion of the VGA to NTSC converter of the present invention comprising a NTSC sync generator, an ISA bus connector, a FPGA, an oscillator, and other support circuitry.

FPGA 15 is configured into several circuits to perform the operation of the decoder 18 and the circuitry needed to connect and control the operation of the other three primary components of the converter 10. Turning to FIG. 4, the circuit operations to be performed by the FPGA 18 are created by programmed instructions provided by a memory 19, such as a PROM.

Figure 6A:
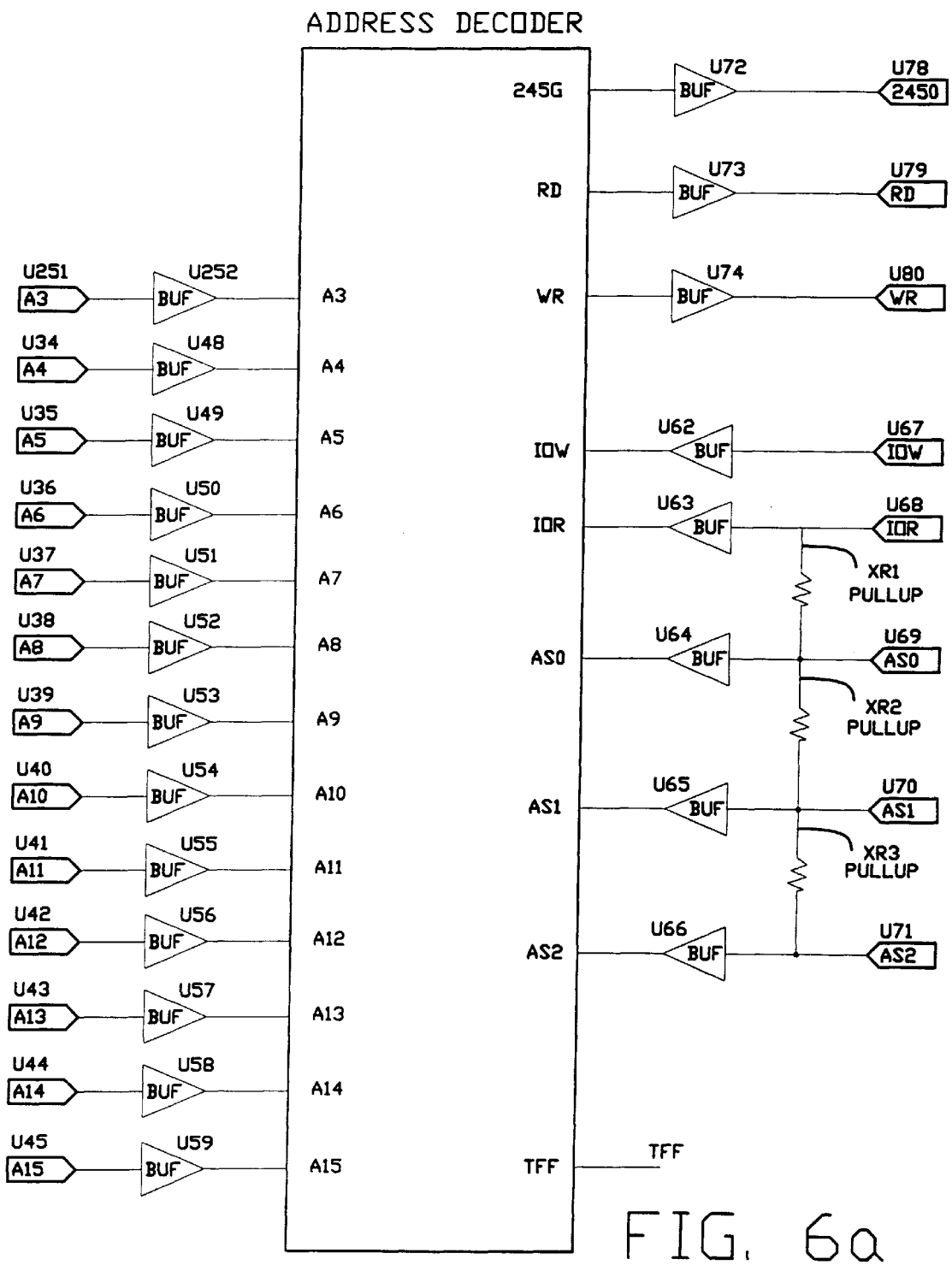
FIGS. 6(a) and 6(b) illustrate a block diagram and a circuit diagram, respectively, for an address decoder portion of a field programmable gate array used in the present invention for generating read and write signals to the RGB to NTSC encoder from the ISA bus.
Figure 6B:
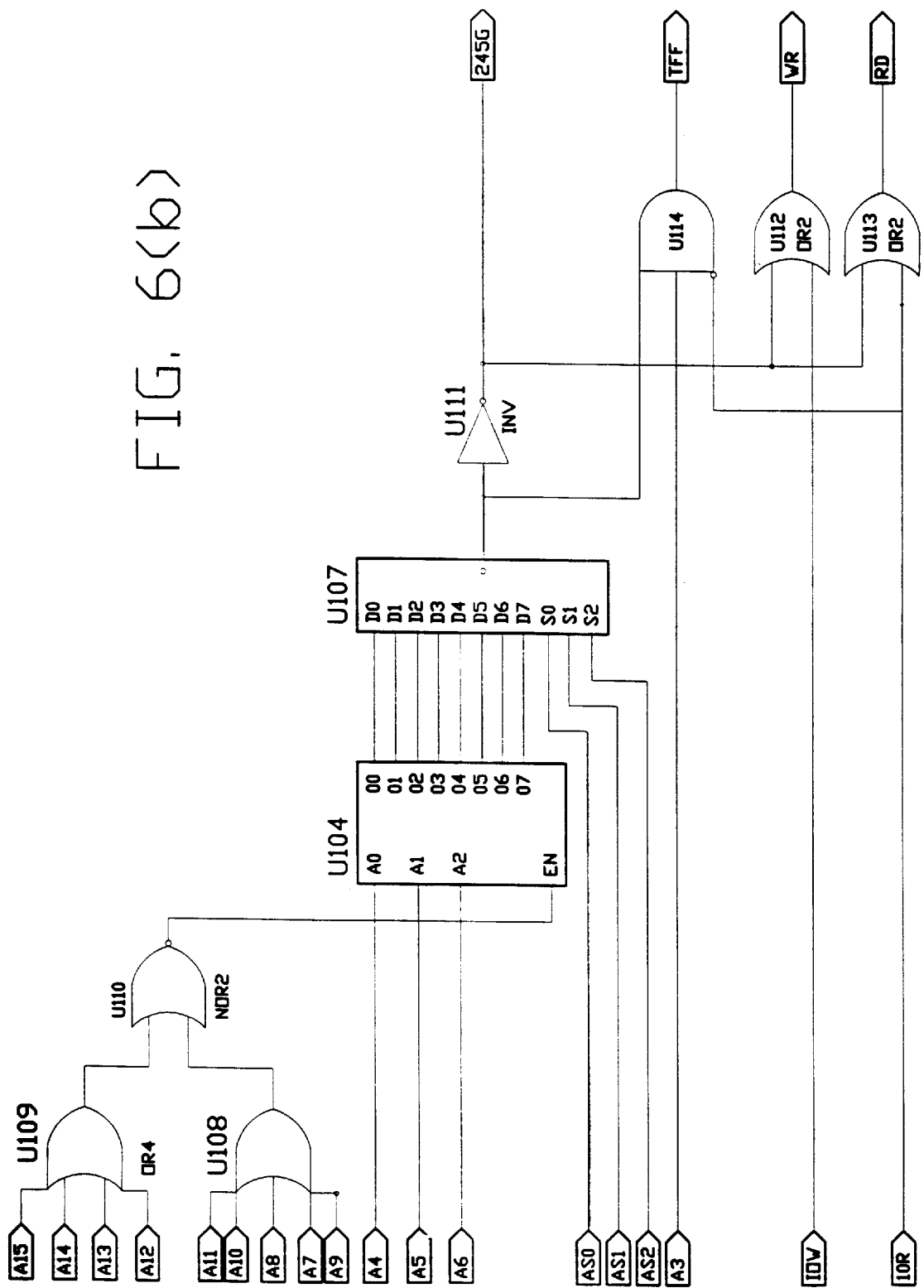
Figure 7A:
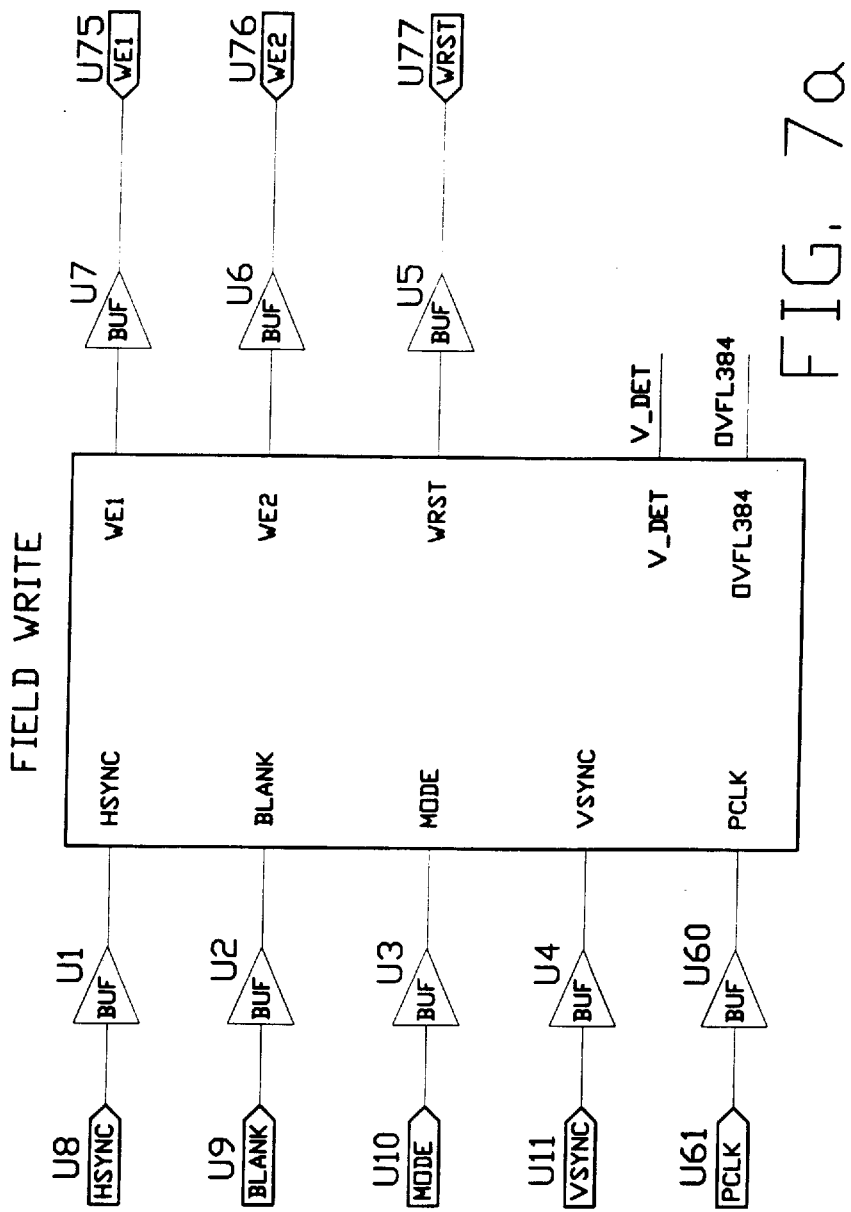
FIGS. 7(a) and 7(b) illustrate a block diagram and circuit diagram, respectively, of a field write circuit of a field programmable gate used in the present invention for generating write enable signals to the field buffer and for generating signals to indicate which VESA mode has been detected.
Figure 7B:
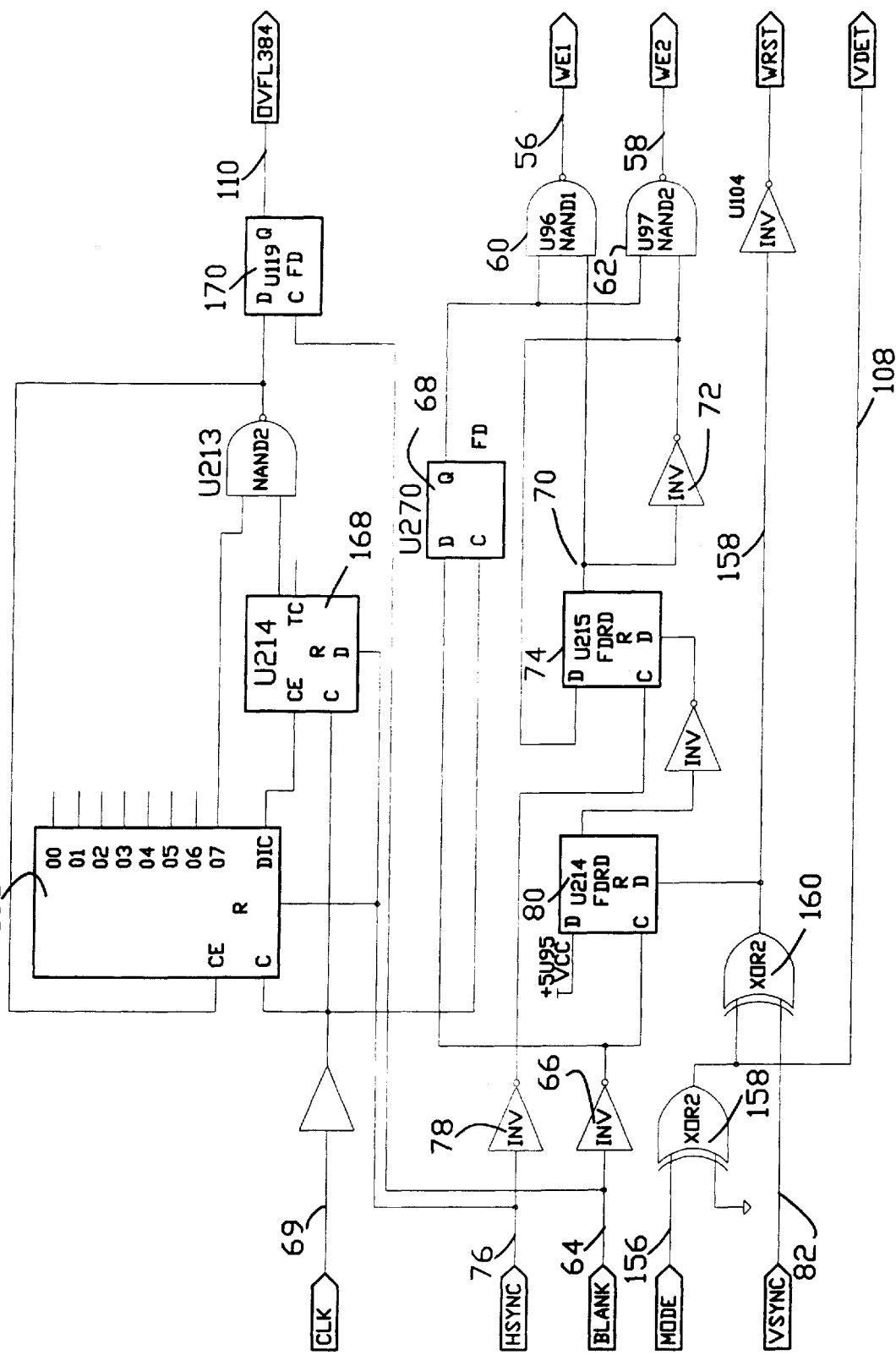
Figure 8A:
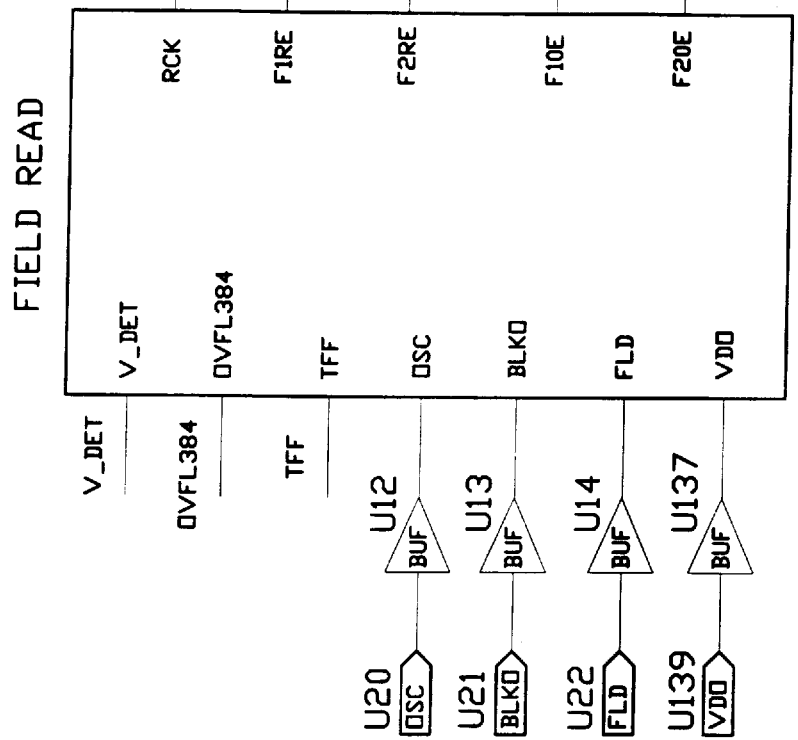
FIG. 8(a) and 8(b) illustrate a block diagram and detailed block diagram, respectively, of a field read portion of a field programmable gate array used in the present invention for generating read enable and output enable signals to the field buffer.
Figure 8B:
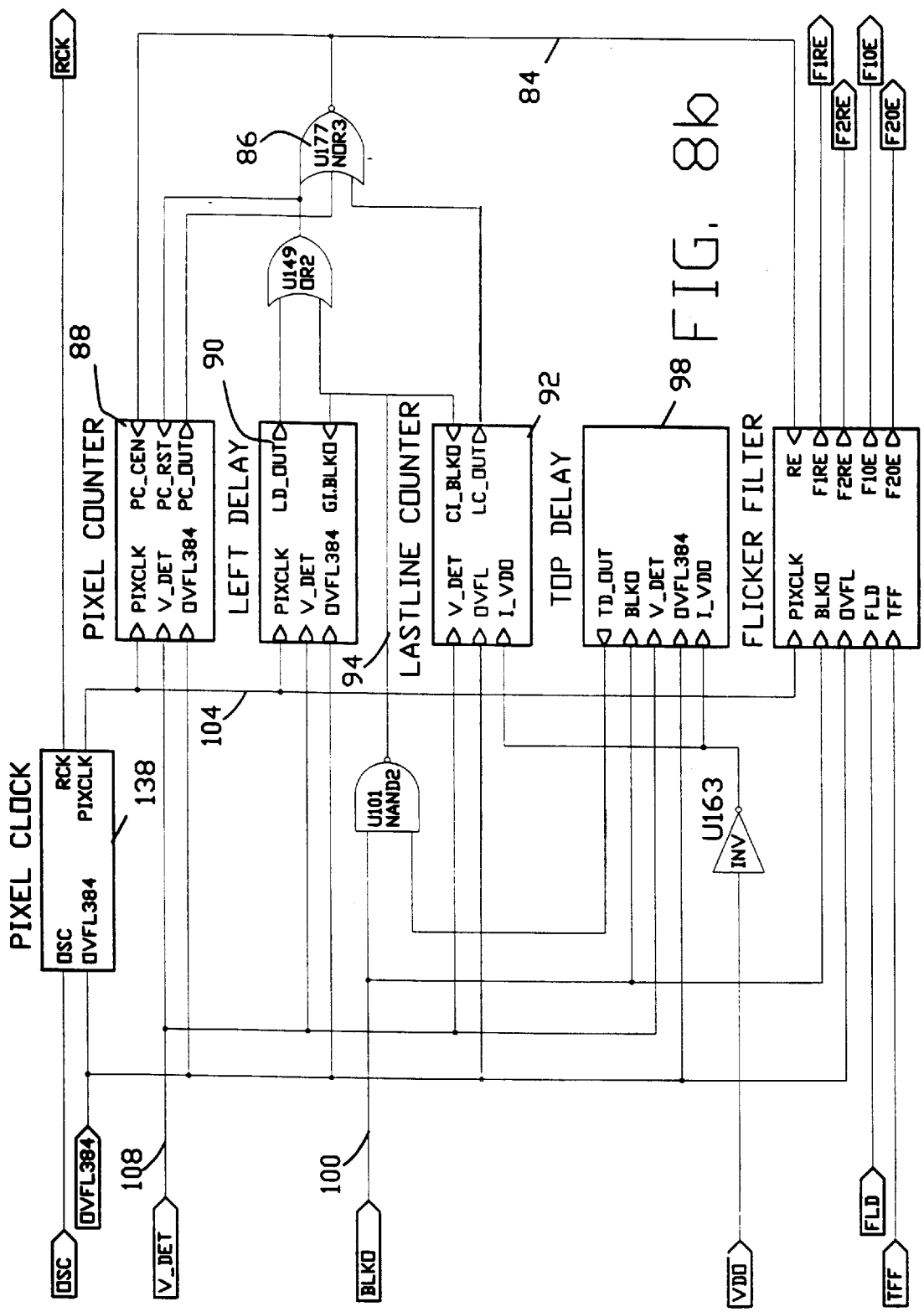
Figure 11:
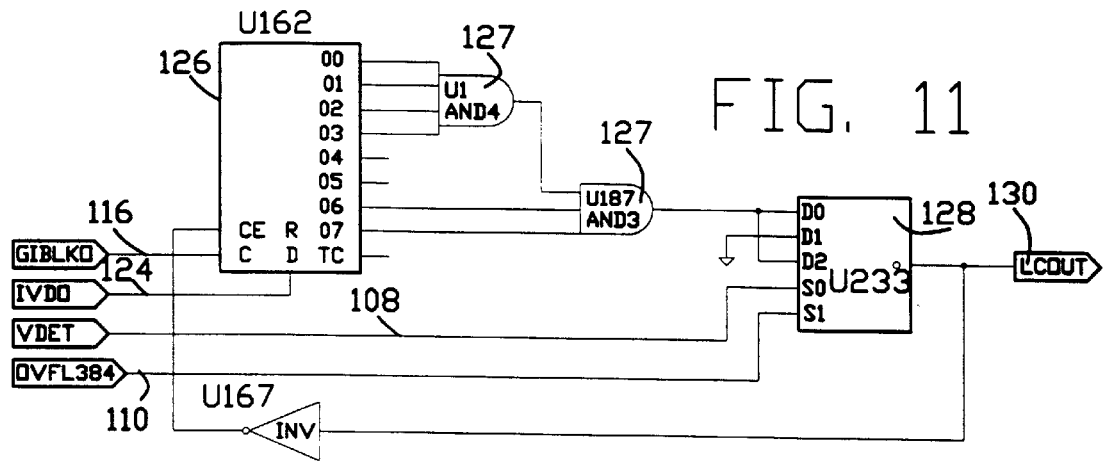
FIG. 11 illustrates a circuit diagram of a last line counter depicted in FIG. 8(b) and used in the present invention for generating a last line indication signal which is dependent on the VESA graphic mode indicated by the circuitry of FIG. 7(b).
Figure 12:
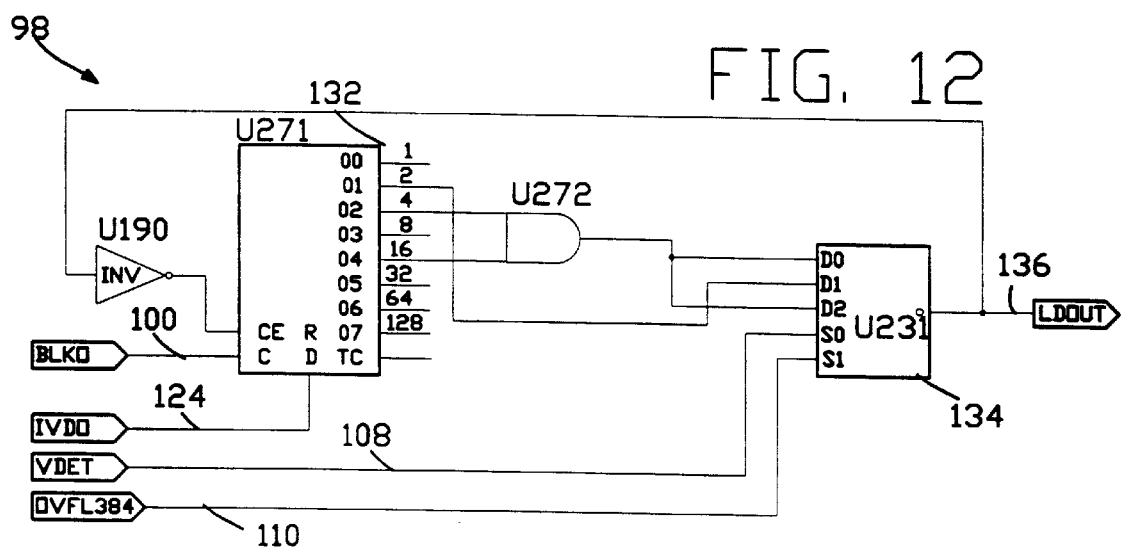
FIG. 12 illustrates a circuit diagram of a top delay circuit depicted in FIG. 8 (b) and used in the present invention for generating a top delay signal which depends on the VESA graphic mode indicated by the circuitry of FIG. 7(b).
Figure 13:
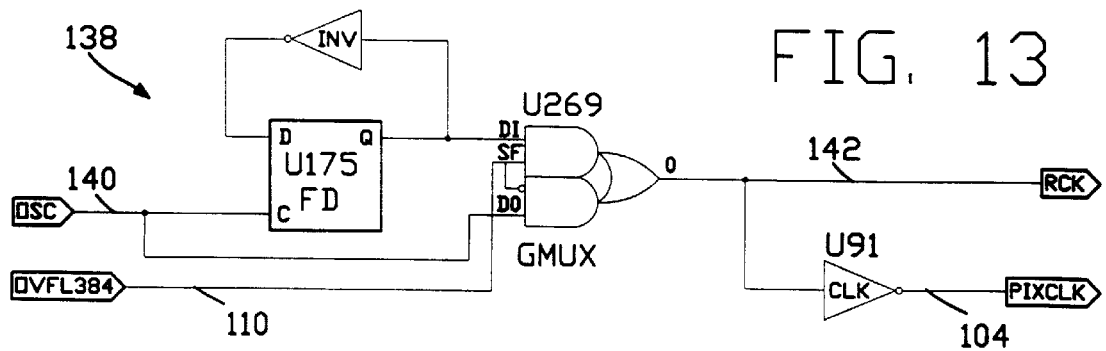
FIG. 13 illustrates a circuit diagram of a pixel clock generator circuit depicted in FIG. 8(b) and used in the present invention for generating a pixel clock signal which depends on the VESA graphic mode indicated by the circuitry of FIG. 7(b).

The circuit operations performed by the FPGA 18 are generally illustrated in FIGS. 6(a), 7(a), and 8(a) which, respectively, depict an address decoder, field write controller, and field read controller. Correspondingly, FIG. 6(b) details the address decoder controller of FIG. 6 (a); FIG. 7 (b) details the field write controller of FIG. 7(a); and FIG. 8(b) details the field read controller of FIG. 8(a) In addition, FIG. 9 depicts the pixel counter of FIG. 8(b); FIG. 10 depicts the left delay counter of FIG. 8(b); FIG. 11 depicts the last line counter of FIG. 8(b) FIG. 12 depicts the top delay of FIG. 8(b); FIG. 13 depicts the pixel clock of FIG. 8(b); and FIG. 14 depicts the optional flicker filter of FIG. 8(b).

Figure 14:
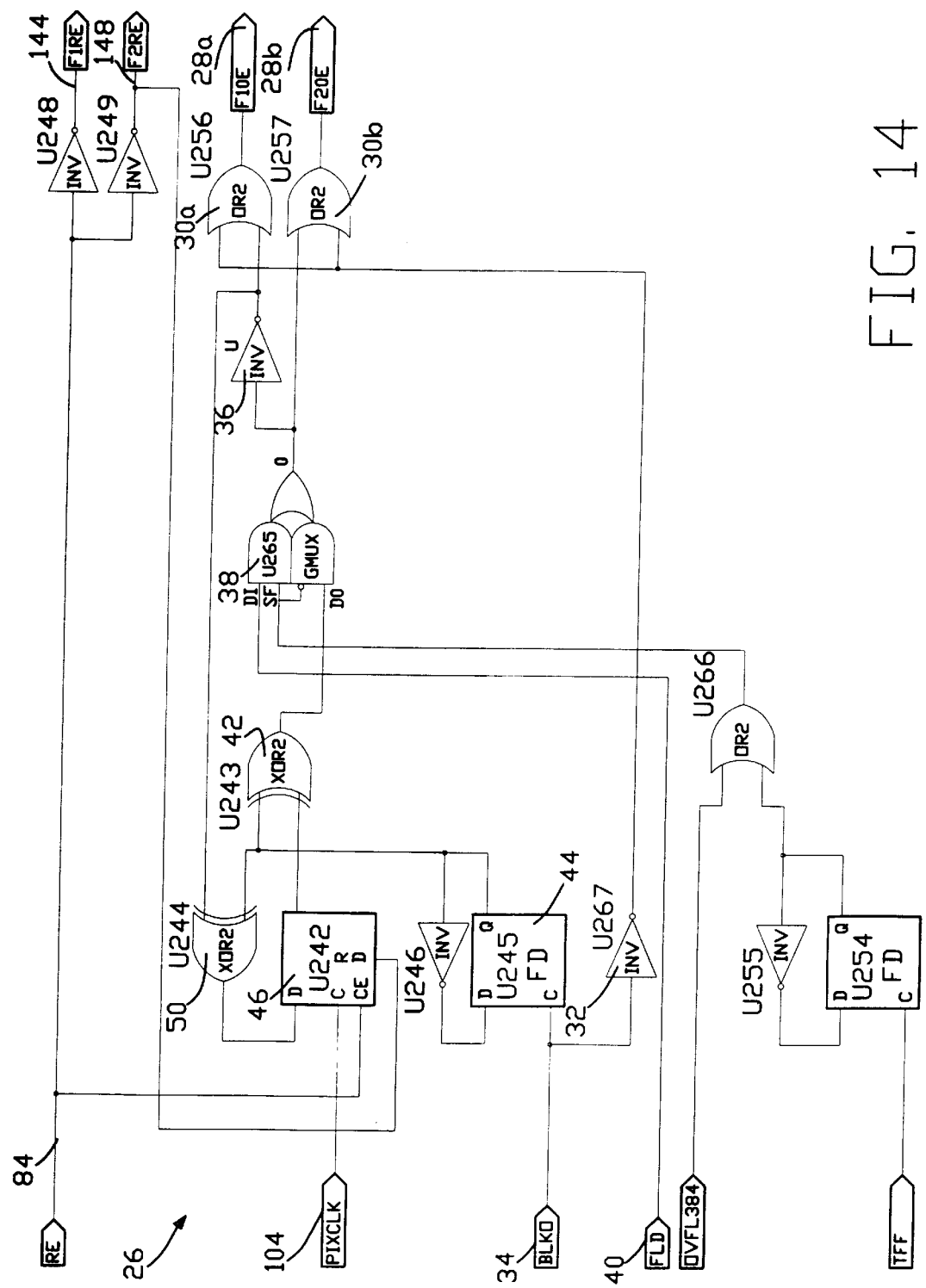
FIG. 14 illustrates a circuit diagram of a flicker filter circuit depicted in FIG. 8(b) and used in the present invention for generating output enable signals to the field buffer depending on the VESA graphic mode indicated by the circuitry of FIG. 7(b).

The operation of the flicker filter as illustrated in FIG. 14 will now be described with reference to FIG. 14.

Flicker is caused on an NTSC monitor screen when a pixel or a horizontal group of pixels of a higher intensity are bordered on both the top and bottom by lower intensity pixels. Since a single NTSC line is scanned on every other field, the amount of time it takes to rescan the line containing the high intensity pixels is long enough to allow the phosphor to begin to fade. This fading becomes more noticeable the greater the differences between the high intensity pixels and the bordering low intensity pixels.

In order to reduce this flicker, the circuit illustrated in FIG. 14 is implemented, referred to as a flicker filter 26. The flicker filter 26 affects the way the pixel data is read from the frame buffer 14 of FIG. 1. Normally, the data is read from the individual field buffer memory chips 24a, 24b of FIG. 3 on alternating fields. When the flicker filter 26 is turned "on", the reading of the individual field buffer memory chips 24a, 24b alternate on every pixel. The flicker filter 26 also alternates between the field buffer memory chips 24a, 24b in starting each line. Likewise, this alternating pattern carries over with the start of each frame. This produces the following effect as illustrated below where "B" is indicative of black pixels and "W" is indicative of white pixels. With the flicker filter 26 turned "off" the frame and lines within the frame have the following effect.

| | Flicker Filter "Off": | |
|---|---|---|
| | FRAME 1 | FRAME 2 |
| Line 1 | BBBBBBBBBBBBBBBBBBBB | BBBBBBBBBBBBBBBBBBBB |
| Line 2 | WWWWWWWWWWWWWWWWWWWW | WWWWWWWWWWWWWWWWWWWW |
| Line 3 | BBBBBBBBBBBBBBBBBBBB | BBBBBBBBBBBBBBBBBBBB |
| Line 4 | BBBBBBBBBBBBBBBBBBBB | BBBBBBBBBBBBBBBBBBBB |
| Line 5 | BBBBBBBBBBBBBBBBBBBB | BBBBBBBBBBBBBBBBBBBB |
| Line 6 | BBBBBBBBBBBBBBBBBBBB | BBBBBBBBBBBBBBBBBBBB |
| Line 7 | BBBBBBBBBBBBBBBBBBBB | BBBBBBBBBBBBBBBBBBBB |
| Line 8 | WWWWWWWWWWWWWWWWWWWW | WWWWWWWWWWWWWWWWWWWW |

The final primary component of the present invention is the field programmable gate array (FPGA) which acts as "glue logic." The FPGA 18, in a preferred embodiment, may be a XILINX® XC3130A (Xilinx, Inc., San Jose, Calif). The However, with the flicker filter 26 turned "on", the flicker filter has the following effects on the pixels.

Flicker Filter "On":

|        | FRAME 1                 | FRAME 2                 |
|--------|-------------------------|-------------------------|
| Line 1 | BWBWBWBWBWBWBWBWBWBW    | WBWBWBWBWBWBWBWBWBWB    |
| Line 2 | WBWBWBWBWBWBWBWBWBWB    | BWBWBWBWBWBWBWBWBWBW    |
| Line 3 | BBBBBBBBBBBBBBBBBBBB    | BBBBBBBBBBBBBBBBBBBB    |
| Line 4 | BBBBBBBBBBBBBBBBBBBB    | BBBBBBBBBBBBBBBBBBBB    |
| Line 5 | BBBBBBBBBBBBBBBBBBBB    | BBBBBBBBBBBBBBBBBBBB    |
| Line 6 | BBBBBBBBBBBBBBBBBBBB    | BBBBBBBBBBBBBBBBBBBB    |
| Line 7 | WBWBWBWBWBWBWBWBWBWB    | BWBWBWBWBWBWBWBWBWBW    |
| Line 8 | BWBWBWBWBWBWBWBWBWBW    | WBWBWBWBWBWBWBWBWBWB    |

The effect that the flicker filter 26 has is that what would ordinarily look like a very thin line that flickers on the monitor now appears fatter and dimmer and, therefore, does not appear to flicker. This elimination of flicker results from half of the white pixels being updated on every field.

Referring now to the detailed operation of the flicker filter 26 in FIG. 14, output enables 28a, 28b for the field buffer memory chips 24a, 24b in FIG. 3 are driven by OR gates 30a, 30b, respectively. one input of each of the OR gates 30a, 30b is driven by an inverter 32, which, in turn, is driven by the BLKO signal 34 which is provided by the SYNC generator 16 of FIG. 4. Correspondingly, this combination turns the output enables 28a, 28b "off" during a blanking period. The other input of both OR gates 30a, 30b goes to opposite ends of an inverter 36. This ensures that only one of the field buffer enables can be active at any given time.

A multiplexer 38 drives the inverter 36 and one of the inputs to OR gate 30(b). The multiplexer 38 chooses one bit from two sources, D1 or D0, under the control of a select input SE which is used for turning the flicker filter 26 on and off. If the select input SE is high (flicker filter 26 "off"), D1 is selected which is the FLD signal provided by the NTSC sync generator 16 of FIG. 4. The output signal from the multiplexer 38, therefore, alternates high and low on every other field as commanded by the FLD output from the sync generator. Correspondingly, if the select input SE is low (the flicker filter 26 "on"), D0 is selected, which is the output of an exclusive OR gate (XOR) 42.

One input of the XOR gate 42 is driven by a Q output of a flip flop 44 having its D input connected to its own inverted Q output. The flip flop 44 is clocked by the BLKO signal 34 which causes the flip-flop's Q output to reverse state with every horizontal line. The other input of the XOR gate 42 is driven by the Q output of another flip flop 46. The flip flop 46 is clocked by a PIXCLK signal 104 which is provided by the pixel clock generator of FIG. 13 and is at 14.3181 MHz for both the 640×480 graphics mode and text mode and at 7.159 MHz for the 320×200 mode, and the D input of the flip flop 46 is the output of an XOR gate 50. One of the inputs of the XOR gate 50 is driven by the Q output of the flip-flop 44 while the other input of the XOR gate 50 is driven by the output of the inverter 36. This circuitry combination causes the D input of the flip flop 46 to change state on every cycle of the PIXCLK signal 104. Therefore, the output of the XOR gate 42 changes state on every cycle of the PIXCLK signal 104 except at the beginning of a horizontal line wherein the first cycle of the PIXCLK signal 104 produces the same level at the output of the XOR gate 42 as did the last cycle of the PIXCLK signal 104 of the previous line.

Therefore, with the flicker filter 26 turned "on", the output enables 28a, 28b alternate with every cycle of the PIXCLK signal 104 except at the beginning of a horizontal line where the output enables 28a, 28b repeat the last phase of the previous line. Since there are an even number of cycles of the PIXCLK signal 104 on a line, the phase of the output enables 28a, 28b that starts each line is opposite of that which started the previous line. Likewise, since there are an even number of lines in a frame, the phase of the output enables 28a, 28b that starts each frame is opposite of that which started the previous frame. Therefore, this will result in the elimination of flicker.

The scan conversion method of the present invention from VGA to NTSC will now be explained hereinafter with reference to the figures. Background information is provided to understand the differences between the types of signals and the ways in which those signals are scanned.

As previously set forth, one of the main differences between non-interlaced VGA signals and interlaced NTSC signals is the way these signals are scanned across the screen.

The method of converting the way the VGA monitor is scanned to the way an NTSC monitor is scanned is to store the pixel data for the line in a pair of memory chips alternately writing odd-numbered lines and even-numbered lines in separate chips. Then, when the information is read out, the information read from the chip containing odd-numbered lines is used to create one field of NTSC information and then from the chip containing even-numbered lines to create the other field of information. To control the writing of pixel data into the pair of field buffer memory chips 24a, 24b, the VGA sync signals that are present at the feature connector 20 are used. However, the VGA sync signals differ depending on whether the VESA 640×480 graphics mode, 320×200 graphic mode or text mode is used. The converter 10 detects and converts in three different modes, and the timing of the sync signal is different for each mode. In a 640×480 graphics mode, the VSYNC signal is approximately 60 Hz, the HSYNC signal is approximately 31.5 kHz, and the PCLK signal is approximately 25 MHz. In a 320×200 graphics mode, the VSYNC signal is approximately 70.4 Hz, the HSYNC signal is approximately 31.5 kHz, and the PCLK signal is approximately 12.5 MHz. Finally, in a text mode, the VSYNC signal is approximately 70.4 Hz, the HSYNC signal is approximately 31.5 kHz, and the PCLK signal is approximately 28.5 MHz. Turning to FIG. 7(b), the circuitry for generating write enable signals 56, 58 to the field buffer (not shown) is depicted. Two NAND gates, 60, 62, are used to generate, respectively, the write enable signals 56, 58. The NAND gates are enabled upon the latching of the inverted BLANK signal 64, provided via the feature connector 20 of FIG. 3. The BLANK signal 64 is inverted by inverter 66 and latched by flip-flop 68 upon the clocking of the PCLK signal 69.

Once enabled, the NAND gates 60, 62 alternate in enabling the field buffer memory chips 24a and 24b of FIG. 3 since the clocking input signal 70 to NAND gate 60 is inverted via the inverter 72, in order to provide a transposed clocking input signal to NAND gate 62. In addition, the clocking input signal 70 is generated by the alternating output of flip-flop 74 which is clocked by the inverted HSYNC signal 76, provided via the feature connector 20 of FIG. 3. The HSYNC signal 76 is inverted by inverter 78. Finally, the flip-flop 74 is reset by the inverted output of flip-flop 80 which is clocked by the inverted BLANK signal 64 and reset by the VSYNC signal 82 which has been inverted depending on whether the VSYNC signal is from a 640×480 graphics mode signal or the other two VESA modes.

Likewise, to control the reading of pixel data from the field buffer memory chips 24a, 24b, the NTSC sync generator 16 is provided. The NTSC sync generator 16 generates NTSC standard VSYNC, HSYNC and BLANK signals. The signals for the NTSC sync generator 16 remain constant regardless of the mode. That is, the VSYNC signal is always 60 Hz and HSYNC signal is always 15.6 Khz. The pixel clock is generated from the oscillator used to run the NTSC sync generator 16 and is 14.3181 MHz for the 640×480 graphics mode and the text mode. For the 320×200 graphics mode, the pixel clock is divided by two to create 7.158 MHz.

Turning to FIG. 8(b), a read signal 84 is generated by the NOR gate 86. The NOR gate 86 receives input from the pixel counter 88, left delay 90, last line counter 92, and the NAND output 94 of the top delay 98 and BLKO 100 inputs.

Referring to FIG. 9, the circuitry of the pixel counter 88 is depicted. The pixel counter 88 receives a reset command (PC-RST 102) from the left delay of FIG. 8(b), a pixel clock signal (PIXCLK 104) from the pixel clock generator of FIG. 13, a pixel clock enable signal (PC-CEN 106) consisting of the read signal 84 of FIG. 8(b), and two mode detection signals (V-DET 108 and OVFL 384 110) which are both from the field write of FIG. 7(b). The pixel counter 88 counts the number of pixels across a horizontal line and generates the PC-OUT 114 signal upon the counting of 656 pixels for 640×480 graphics mode, 328 pixels for 320×200 graphics mode, and 738 pixels for text mode. The pixel counter 88 is switched to the correct VESA mode by the mode detection signals V-DET 108 and OVFL384 110 which are received by a multiplexer 112. The multiplexer 112 provides the pixel count output (PC-OUT 114) as commanded by the mode detection signals.

Moving to FIG. 10, the left delay counter 90 is depicted. The left delay counter 90 receives the pixel clock signal (PIXCLK) 104 from the pixel clock generator of FIG. 13, a GI-BLKO signal 116 consisting of the NAND output 94 of the top delay 98 and BLKO 100 inputs of FIG. 8(b), and the two mode detection signals, V-DET 108 and OVFL384 110, from the field write of FIG. 7(b). The left delay counter 90 counts the number of PIXCLK 104 cycles whenever the counters 118 and 120 are not being reset by the GI-BLKO signal 116 and are enabled by the left delay output (LD-OUT 117). Once enabled to begin counting, the counters 118 and 120 count the number of pixel clock cycles and provide a delay signal (LD-OUT 117) to three NAND gates 121 in conjunction with multiplexer 122, until a specific count is obtained. The count required to release the left delay signal 117 is controlled by the V-DET 108 and OVFL384 110 signals which are received by the multiplexer 122.

Referring to FIG. 11, the circuitry of the last line counter 92 is depicted. The last line counter 92 receives the GI BLKO signal 116 consisting of the NAND output 94 of the top delay 98 and BLKO 100 inputs of FIG. 8(b), an I-VDO 124 signal which is inverted from the NTSC sync generator 16 of FIG. 4, and the two mode detection signals, V-DET 108 and OVFL384 110, from the field write of FIG. 7 (b). The last line counter 92 counts the number of GI-BLKO 116 cycles whenever the counter 126 is not being reset by the I-VDO 124 signal and is clock enabled by the inverted last line counter output signal (LC-OUT 130). Once enabled, the counter 126 counts the number of GI-BLKO 116 cycles and provides a last line signal via two AND gates 127 in conjunction with multiplexer 128 when a specific count is obtained. The count required to provide a last line signal is controlled by the V-DET 108 and the OVFL384 110 signals which are received by the multiplexer 128.

Turning to FIG. 12, the top delay 98 circuitry is depicted. The top delay 98 receives the BLKO 100 signal of FIG. 8(b), the I-VDO 124 signal which is inverted from the NTSC sync generator 16 of FIG. 4, and the two mode detection signals, V-DET 108 and OVFL384 110, from the field write of FIG. 7(b). The top delay 98 counts the number of BLKO 100 cycles and generates a top delay whenever the counter 132 is not being reset by the I-VDO 124 signal and is clock enabled by the inverted top delay output signal TD-OUT 136. Once enabled, the counter 132 counts the number of BLKO 100 cycles and provides a top delay signal, via multiplexer 134, when a specific count is obtained. The count required to provide a top delay is controlled by the VDET 108 and OVFL384 110 signals which are received by the multiplexer 134.

Finally, referring to FIG. 8(b), the PIXCLK 104 signal is generated by the pixel clock generator 138. In FIG. 13, the circuitry of the pixel clock generator 138 is depicted. The pixel clock 138 receives an oscillator signal (OSC 140) from the oscillator 141 of FIG. 4. The pixel clock generator produces the PIXCLK 104 and a clock (RCK 142) which both operate at approximately 14.3181 MHz when the OVFL384 signal 110 is "off" and at 7.159 MHz when the OVFL384 110 is "on.

Turning back to FIG. 8(b), the flicker filter receives the read 84 signal from the NOR gate 86. In FIG. 14, the read signal is inverted by the flicker filter to produce two read enable outputs 144,148, respectively, for the field buffer memory chips 24a and 24b of FIG. 3. Furthermore, as discussed previously, the output enables 28a, 28b turning the output of the field buffer memory chips "off" and "on" corresponding to if the flicker filter is enabled.

As indicated above, in order to facilitate the VGA to NTSC conversion process, the converter 10 of FIG. 1 is capable of automatically detecting which of the ESA modes are provided via the feature connector 20. Thus, once the VESA mode being used is detected, the converter 10 makes the proper adjustment in order to properly convert the VGA signals into NTSC signals. One of the signals used to detect which VESA mode is being used is the VSYNC signal. The VSYNC signal in the 640×480 graphics mode is normally high with a low pulse for a VSYNC signal. Conversely, in the other two modes, the VSYNC signal is inverted. Thus, by applying an integrator and some switching logic to the VSYNC signal, the signal 158 of FIG. 7(b) is obtained which is the same whether in the 640×480 mode or the other two modes. Referring to FIG. 3, the integrator consists of a capacitor C5 and resistor R1 which both have one end connected to ground and the other end connected to a resistor R2. The other end of the resistor R2 is connected to the cathode of a diode which has its anode connected to the VSYNC signal provided by the feature connector 20. The output of the integrator (MODE 156) consists of the signal generated where the capacitor C5, resistor R1 and resistor R2 interconnect. Referring to FIG., 7(b), the MODE 156 signal is inverted by an XOR gate 158. The output of the XOR gate 158 generates the V-DET 108 signal to indicate if the VESA mode being used is 640×480. The V-DET 108 signal provides an input to XOR gate 158. In addition, the VSYNC 82 signal is provided to the other input of the XOR gate 158 in order to produce the signal 158 which is a VSYNC signal that is the same whether in the 640×480 mode, 320×200 mode, or text mode.

Furthermore, to detect the 320×200 graphics mode, the counters 166, 168 of FIG. 7(*b*) are used. The counters 166, 168 count the number of pixel clock (PCLK 69) cycles per line from the feature connector 20 of FIG. 3. The counters 166, 168 are reset at the beginning of each line. If the counters reach a count of 384, a logic low is latched by flip-flop 170 to indicate that it is not the 320×200 mode. If, however, the count of 384 is not reached, a logic high is latched which indicates that the mode is 320×200. If neither the 640×480 signal (i.e., V-DET 108) nor the 320×200 signal (i.e., OVFL384 110) are high, the converter defaults to the text mode. As shown by FIG. 8(*b*) and the above discussion, the pixel counter 88, left delay 90, last line counter 92, and the top delay 98 receive the V-DET 108 signal in order to facilitate the VGA to NTSC conversion process. Likewise, the pixel clock generator 138, pixel counter 88, left delay 90, last line counter 92, top delay 98, and the flicker filter receive the OVFL384 110 signal in order to facilitate the VGA to NTSC conversion process.

It should be understood that various changes and modifications to the presently preferred embodiments described herein will be apparent to those skilled in the art. For example, mounting the converter 10 to a VGA card instead of using an interconnection such as the feature connector. Such changes and modifications may be made without departing from the spirit and scope of the present invention and without diminishing its attendant advantages. It is, therefore, intended that such changes and modifications be covered by the appended claims.

We claim:

1. A system for converting non-interlaced VGA image data to interlaced encoded image signals, the system comprising:

means for detecting an identifiable mode of the non-interlaced VGA image data;

means for storing non-interlaced VGA image data as data within a plurality of field memory areas wherein pixel data from even numbered scan lines and pixel data from odd numbered scan lines are stored in separate field memory areas;

means for controlling operatively connected to the means for storing; and means for filtering the data in the field memory areas so that pixel data from the field memory area storing even numbered scan lines, and pixel data from the field memory location storing odd numbered scan lines, are read alternately for each pixel in each output scan line so that reduced flicker interlaced encoded image signals are produced from the data within the field memory areas.

2. The system of claim 1 wherein the identifiable modes are at least one of a 640×480 graphics mode, a 320×200 graphics mode and a text mode.

3. The system of claim 1 wherein the means for detecting includes a counter to count pixels.

4. The system of claim 1 wherein the means for detecting includes an integrator.

5. The system of claim 1 further comprising:

a memory storing instructions to output to the means for controlling wherein the instructions program the means for controlling.

6. The system of claim 1 wherein the means for storing includes a plurality of field buffer memory locations.

7. The system of claim 6 wherein each of the plurality of field buffer memory locations includes information relating to a corresponding NTSC field.

8. The system of claim 1 wherein the means for controlling is a field programmable gate array.

9. The system of claim 1 wherein the means for controlling includes a plurality of circuits operatively connected from a group of circuits including an address decoder, a field write controller, a pixel clock generator, a pixel counter, a left delay counter, a last line counter and a top delay counter.

10. A method for converting VGA image signals to NTSC image signals, the method comprising the steps of:

storing non-interlaced VGA image data as data within field memory areas such that pixel data from even numbered scan lines and pixel data from odd numbered scan lines are stored in separate field memory areas;

reading the data in the field memory areas to produce interlaced NTSC encoded image signals;

filtering the pixel data within the field memory areas to reduce flicker within the interlaced NTSC encoded image signals by reading the pixel data from the field memory areas storing even numbered scan lines, and reading the pixel data from the field memory location storing odd numbered scan line pixel data, alternately for each pixel within the output scan lines; and controlling the storing and reading steps through circuitry configured by programmed instructions.

11. The method of claim 10 further comprising the step of:

detecting an identifiable mode of the VGA image signals.

12. The method of claim 11 further comprising the step of:

integrating a VSYNC signal to detect the identifiable mode.

13. The method of claim 11 further comprising the step of:

counting a number of pixel clock signals per line to detect the identifiable mode.

14. The method of claim 10 further comprising the step of:

storing the programmed instructions in a memory.

15. A circuit for controlling the reading of a frame buffer, the circuit comprising:

an input means capable of controlling a switch by producing a signal;

a multiplexer receiving the signal from the input means and producing a driving signal corresponding to either a filtered or unfiltered frame buffer read output enable command;

a first inverter receiving the driving signal and producing an output;

a pair of OR-gates each having a pair of inputs wherein one input of the first OR-gate receives the output of the first inverter and one input of the second OR gate receives the multiplexer driving signal; and a second inverter receiving a blanking signal and producing an output wherein the output is forwarded to a second input of each of the OR-gates wherein each of the OR-gates produces an output enable signal based on its inputs.

16. The circuit of claim 15 wherein the filter frame buffer output enable command circuitry comprises:

a first flip-flop having an alternating output clocked by the blanking signal;

a first XOR gate having two inputs with one input connected to the alternating output of the first flipflop and the second input connected to the output of a second flip-flop, the Q output of the first XOR gate connected to the multiplexer;

a second XOR gate having two inputs with one input connected to the alternating output of the first flip-flop and the second input connected to the output of the first inverter, the output of the second XOR gate connected to the D input of the second flip-flop; and the second flip-flop being clocked by a pixel clock and reset by a read enable signal for reading the frame buffer.

17. A system for converting non-interlaced VGA image data into interlaced encoded image signals, the VGA non-interlaced data including pixel data for image frames containing both odd and even horizontal scan lines, the interlaced encoded image signals including first and second frames, the first frame containing pixel data for even scan lines and the second frame containing pixel data for odd scan lines, the system comprising:

means for detecting an identifiable mode of the non-interlaced VGA image data, the detected mode determining the number of pixels in each scan line of said non-interlaced VGA image data;

means for storing pixel data from even scan lines of said non-interlaced VGA image data in a first memory device;

means for storing pixel data from odd scan lines of said non-interlaced VGA image data in a second memory device: and means for reading the pixel data stored in the first and second memory devices to generate said first and second frames of said interlaced encoded image signal.

18. A system for converting non-interlaced VGA image data to interlaced encoded image signals, the system comprising:

means for storing non-interlaced VGA image data as data within field memory areas:

means for controlling operatively connected to the means for storing; and means for filtering the data in the field memory areas, wherein the means for filtering alternately reads odd-numbered and even-numbered interlaced field memory areas for each pixel in the output scan lines, so that reduced flicker interlaced encoded image signals are produced from the data within the field memory areas.

19. A system for converting non-interlaced VGA image data to interlaced encoded image signals, the system comprising:

means for storing non-interlaced VGA image data as data within a plurality of field memory areas wherein pixel data from even numbered scan lines and pixel data from odd numbered scan lines are stored in separate field memory areas;

means for controlling operatively connected to the means for storing;

a memory storing instructions to output to the means for controlling wherein the instructions program the means for controlling; and means for filtering the data in the field memory areas so that pixel data from the field memory area storing even numbered scan lines, and pixel data from the field memory location storing odd numbered scan lines, are read alternately for each pixel in each output scan line so that reduced flicker interlaced encoded image signals are produced from the data within the field memory areas.

20. A system for converting non-interlaced VGA image data to interlaced encoded image signals, the system comprising:

means for storing non-interlaced VGA image data as data within field memory areas, wherein the means for storing includes a plurality of field buffer memory locations wherein pixel data from even numbered scan lines and pixel data from odd numbered scan lines are stored in separate field memory areas;

means for controlling operatively connected to the means for storing; and means for filtering the data in the field memory areas so that pixel data from the field memory area storing even numbered scan lines, and pixel data from the field memory location storing odd numbered scan lines, are read alternately for each pixel in each output scan line so that reduced flicker interlaced encoded image signals are produced from the data within the field memory areas.

21. The system of claim 20 wherein each of the plurality of field buffer memory locations includes information relating to a corresponding NTSC field.

22. The system of claim 17 wherein said reading means reads pixel data from said first memory device to generate said first frame of said interlaced encoded image signal, and said reading means reads pixel data from said second memory device to generate said second frame of said interlaced encoded image signal.

23. The system of claim 17 wherein said reading means reads pixel data alternatingly between said first memory device and said second memory device producing output scan lines within said first and second frames of said interlaced encoded image signal containing alternating pixel data from adjacent even and odd scan lines of said non-interlaced VGA image data.

* * * * *